(12) United States Patent
Buisman et al.

(10) Patent No.: US 6,630,071 B1
(45) Date of Patent: Oct. 7, 2003

(54) PROCESS FOR THE TREATMENT OF WASTE WATER CONTAINING HEAVY METALS

(75) Inventors: Cees Jan Nico Buisman, Harich (NL); Hendrik Dijkman, Ijlst (NL)

(73) Assignee: Paques Bio Systems B.V., Balk (NL)

( * ) Notice: Subject to any disclaimer, the term of this patent is extended or adjusted under 35 U.S.C. 154(b) by 0 days.

(21) Appl. No.: 09/869,346
(22) PCT Filed: Dec. 29, 1999
(86) PCT No.: PCT/NL99/00815
 § 371 (c)(1),
 (2), (4) Date: Jun. 28, 2001
(87) PCT Pub. No.: WO00/39035
 PCT Pub. Date: Jul. 6, 2000

(30) Foreign Application Priority Data

Dec. 29, 1998 (EP) .............................................. 98204463

(51) Int. Cl.$^7$ ................................................. C02F 3/00
(52) U.S. Cl. .................... 210/610; 210/611; 210/618; 210/800; 210/807; 210/757; 210/912; 210/913
(58) Field of Search ................................ 210/615, 616, 210/617, 618, 800, 807, 757, 610, 611, 912, 913, 914

(56) References Cited

U.S. PATENT DOCUMENTS 4,522,723 A 6/1985 Kauffman et al.

FOREIGN PATENT DOCUMENTS

| DE | 44 33 413 A1 | 3/1996 |
| EP | 0 952 120 A1 | 10/1999 |
| GB | 2 626 868 | 8/1989 |
| WO | WO 99/28514 | 6/1999 |

Primary Examiner—Chester T. Barry
(74) Attorney, Agent, or Firm—Young & Thompson

(57) ABSTRACT

A process for the treatment of waste water containing heavy metals in which sulphur components and/or metals are biologically reduced to precipitate the metals as water-insoluble metal species, which are separated from the waste water. The biological reduction and the precipitation of the metal species are carried out in a moving sand bed, in which sand particles partly immobilize the bacteria and retain the precipitated metal species, treated waste water is separated from the precipitated metal species and the precipitated metal species are subsequently separated from the sand particles. Metals like selenium and uranium can be precipitated without sulphur components, whereas metals like antimony, cadmium, copper, zinc and the like are precipitated as sulphides.

11 Claims, 1 Drawing Sheet

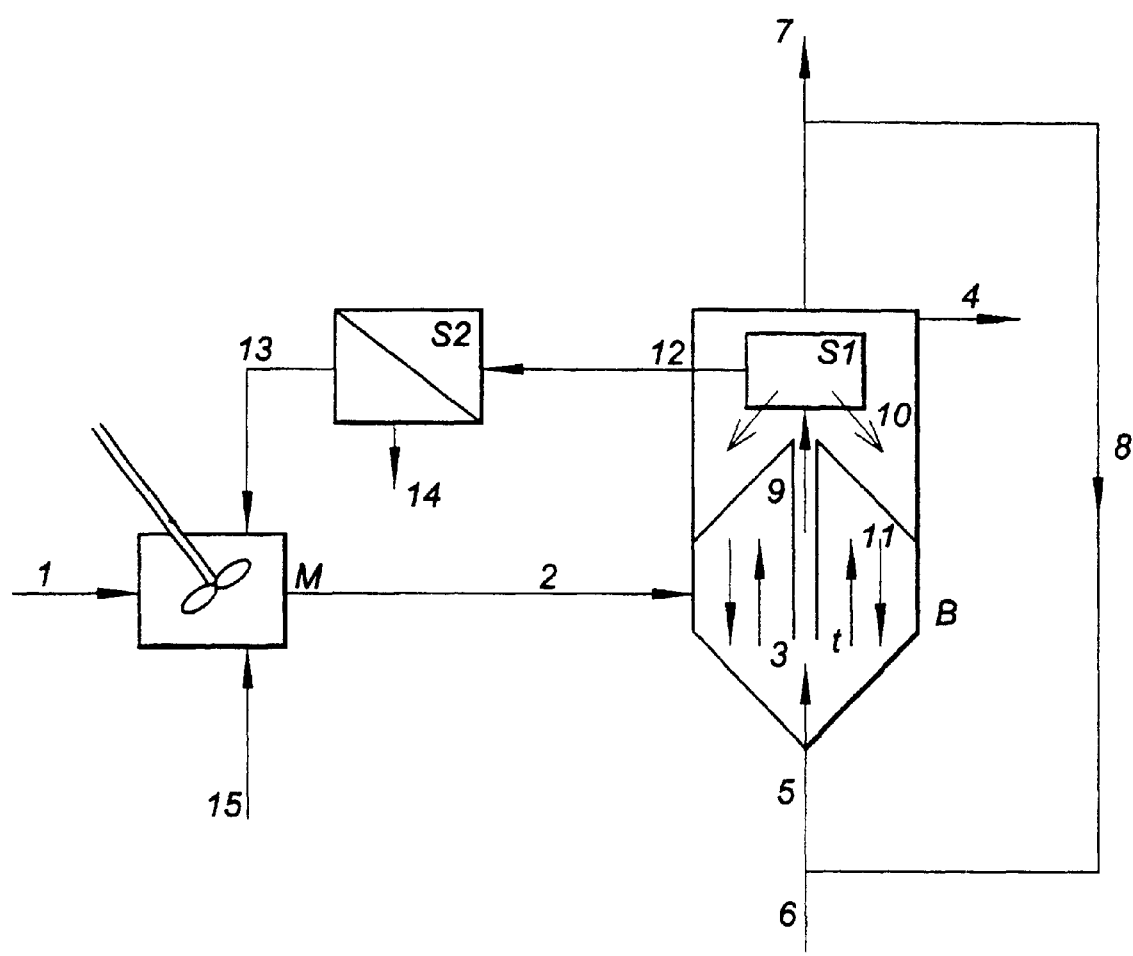

PROCESS FOR THE TREATMENT OF WASTE WATER CONTAINING HEAVY METALS

BACKGROUND

The present invention relates to the treatment of waste water containing sulphate and heavy metals involving biological reduction and precipitation of water-insoluble metal species. The biological reduction can be a reduction of a metal to a lower valence in which form the metal precipitates as a metal sulphide, metal carbonate, metal oxide or hydroxide, metal phosphate or as the elemental metal, or it can be a reduction of a sulphur components such as sulphate to produce hydrogen sulphide which chemically precipitates the metal as a metal sulphide, or it can be both reduction of the metal and of the sulphur components with precipitation of metal sulphide. The metal precipitates are separated from the waste water.

A process in which sulphates are biologically reduced to sulphide which precipitate metals as metal sulphides is known from WO 80/02281, WO 91/16269 and WO 97/29055. In these prior art processes the metal sulphides are formed in conventional bioreactors and separated off in settling tanks. These processes are not very suitable for dilute waste water streams, i.e. containing heavy metal ions in the ppm range, since the hydraulic limitations would necessitate the use of relatively large bioreactor volumes and would make the process too expensive.

U.S. Pat. No. 4,522,723 describes a batch-wise process for reducing the concentration of heavy metals and sulphate ions in mine effluents by percolating the effluent through sand and soil containing sulphate-reducing bacteria. The insoluble metal sulphides can be recovered by flotation or filtration, but the patent does not contain specific information on such recovery.

Remacle and Houba (Int. Conference on Heavy Metals in the Environment, Jan. 1, 1983, p. 936–939) propose to extract heavy metals from industrial waste water by accumulation in bacteria in a fluidised sand bed. According to this proposal, the bacteria together with the metals are intermittently sheared from the sand and further processed. No separation between metals and bacteria is provided. Thus the problem of providing an economically feasible process for separating heavy metals from waste streams resulting in a compact metal residue remains to be solved.

DESCRIPTION OF INVENTION

A continuous process has now been found, which solves the problem of treating dilute waste waters containing heavy metals, whilst producing a non-diluted residue The process is characterised in that the biological reduction of metals and/or sulphur components present in the waste water or added to the waste water, and the precipitation of metals or metal compounds are performed in a sand bed. Sand particles in the sand bed at least partly immobilise the bacteria and retain the precipitated metal species. Treated waste water is separated from the sand particles and from the metal precipitates, preferably by gravitation. The sand particles are washed, separating the precipitated metals and part of the biomass from the sand. Any small amounts of residual sulphide in the effluent can be biologically or chemically removed downstream from the sand bed.

In an advantageous embodiment, the sand bed is a so-called moving sand bed, i.e. a sand bed which is in continuous movement so as to allow simultaneous filtration of the metal, precipitates from the waste water and separation of the metal precipitates from the sand particles. A suitable moving sand bed is a so-called dynamic sand filter as described in EP-A-590705, and schematically depicted in FIG. 1. A dynamic sand bed to be used according to the invention is different from a fluidised bed, which is essentially a static bed. In such a dynamic sand filter, a reducing biomass is immobilised on the sand particles as a result of biofilm formation. The sand at the bottom is continuously removed upward e.g. by means of a gas flow (nitrogen or air), which acts as a mammoth pump. The rate at which the sand is removed and subsequently cleaned can be controlled according to the method of WO 98/39255, which ensures that the metals will end up in a concentrated stream. Thus, the gas supply can be controlled as a function of the sand bed resistance for a clean sand bed. The operation of the sand filter is further illustrated in the description of the figures below.

The process of the invention can be used for removing metals which can be precipitated, after biological reduction to a suitable valence state, as such or as a salt with anions that are normally present in waste water (hydroxide, carbonate, oxide, sometimes phosphate or sulphate) or can be added (pH increase). The reduced metals form insoluble precipitates, which are separated from the sand particles and from the waste water. For example, selenium and tellurium can be precipitated in the elemental form (e.g. $Se^{6+} \rightarrow Se^{4-} \rightarrow Se^{0}\downarrow$), chromium can be precipitated as hydroxide (e.g. $Cr^{6+} \rightarrow Cr^{3+} \rightarrow Cr(OH)_3\downarrow$), uranium (IV) and vanadium (IV) can be precipitated as hydroxide, oxide or carbonate (e.g. $U^{6+} \rightarrow U^{4+} \rightarrow UO_2\downarrow$), and manganese can be precipitated as carbonate (e.g. $Mn^{6+} \rightarrow Mn^{4-} \rightarrow Mn^{2+} \rightarrow MnCO_3\downarrow$)

The process can also be used for removing metals which require additional reagents to be precipitated, in particular sulphide ions; the metals are then, if necessary after reduction, contacted with sulphide to form insoluble metal sulphides which are separated off. The sulphide is produced in situ by biological reduction of sulphur components having a higher oxidation state, such as sulphate, sulphite, thiosulphate, elemental sulphur. These sulphur components may already be present in the waste water containing the heavy metals, as in the case of e.g. sulphate in mine effluents, or be added, e.g. in the form of elemental sulphur. Metals that can be precipitated as sulphide include (monovalent:) Ag, Tl, In, (divalent:) Cu, Zn, Cd, Ni, Fe, Pb, Sn, Hg, Co, Mn, (trivalent:) As, Sb, Bi, Cr, (tetravalent:) Mo, Ti. Some of these may be biologically reduced from higher valence states such $Fe^{3+}$, $As^{5+}$, $Sb^{5+}$, $Bi^{5+}$, $Tl^{3+}$, $In^{3+}$, $Mn^{6+}$, etc, prior to the precipitation step.

Suitable bacteria for reducing sulphur components to sulphide in the anaerobic sand bed reactor include sulphur and sulphate reducing bacteria, such as species from the genera: *Desulforomonas sp* (mesophilic), Desulfotomaculum KT7 (thermophilic), the species *Desulforolobus anibivalens, Acidianus infermus, Acidianus brierley, Stygiolobus azoricus* (mesophilic), *Thermoproteus neutrophilus, Thermoproteus tenax, Thermodiscus maritimus* (thermophilic), *Pyrobaculum islandicum, Pyrodictium occultum, Pyrodictium brockii* (hyperthermophilic), and other species of the genera Desulfovibrio, Desulfotomaculum, Desulfomonas, Thermodesulfobacterium, Desulfobulbus Desulfobacter, Desulfococcus, Desulfonema, Desuifosarcina, Desulfobacterium and Desulforomas (mesophilic). Suitable bacteria for biological reduction of metals (e.g. As, Mo, Fe, Cr, Mn, Se, Te, Sb, Bi, Hg, U) to lower valence include metal reducing bacteria such as species of the genera Geobacter, Pseudomonas, Shewanella, Desulfovibrio, Desulfobacterium, Desulfomicrobium, Desulforomonas, Alteromonas. In general, these bacteria are available as mixed populations from various anaerobic cultures and/or grow spontaneously in the anaerobic reactor.

The process can be operated at mesophilic conditions (15–40° C.) or at thermophilic conditions (40–90° C.), depending on the temperature of the waste water. Normally mesophilic conditions are expected. The pH can range from 5 to 9, most preferably between 6 and 8.

It will usually be necessary to add an electron donor in order to reduce the sulphur compounds to sulphide, especially in the case of treating water which does not contain organic waste. Depending on the particular use, the following nutrients can be added: hydrogen. carbon monoxide, methanol, ethanol or other alcohols, short-chain fatty acids and other organic compounds such as sugars, starch and organic waste. If necessary, nutrient elements in the form of nitrogen and phosphate are added as well. The addition of trace elements will only exceptionally be necessary, when they are not sufficiently available in the metal-containing water.

Examples of waste water containing heavy metals that can be treated using the process of the invention are ground water, mine effluents, effluents from metallurgical plants and sites, industrial waste water, cooling water or run-off water streams, containing relatively low levels of heavy metals, in particular lower than 100 ppm.

Also effluents of existing water treatment systems can be treated to lower the metal concentrations even further. Especially interesting are water streams containing metals in such an oxidation state that they cannot be removed by only raising the pH such as in conventional lime treatment systems. For example, dissolved oxidised selenium components can be removed biologically according to the invention by reducing the metal to the elemental selenium form which precipitates out. Also e.g. uranium can be removed biologically by reducing the valence from 6+ to 4+ and subsequent precipitation as an oxide, carbonate, hydroxide or the like. Metals like lead, tin, bismuth, antimony, cadmium, mercury, silver, zinc, copper, nickel, cobalt, iron, manganese, chromium, vanadium and titanium precipitate very efficiently as metal sulphides.

DESCRIPTION OF THE FIGURE

In the installation according to FIG. 1, the metal-containing waste water (1) is led into a mixing tank (M) in which the temperature and pH are adjusted if necessary and electron donor can be added (15). Due to the wash water recycle stream recycle (13) the redox potential of the water (2) entering the moving bed sand filter (B) is lowered which enhances the biological activity in the filter. Water flows from the bottom to the top (3) through the sand particles moving slowly from the top to the bottom (11). The recirculation of sand particles is created by means of inserting gas (5) in a small inner tube (t). Due to the gas a mammoth pump is created and water, sand and metal precipitates captured in the sand are transported upwards (9) to the sand metal separation system (S1). The metal precipitates are loosened from the sand particles due to the turbulence in the tube (t) and based on difference in settling velocity the large sand particles are returned to the sand bed using gravity (10) and metal precipitates and part of the loosened biomass are removed by means of the wash water stream (12). This stream is led to liquid solid separator (S2) in which the metal precipitates and biomass is separated from the water and removed from the system through (14). The cleared water is returned to the mixing tank (M). The gas (5) inserted in the inner tube (t) is either removed through 7 or preferably recycled through 8. If no gas recycle is used or hydrogen gas is used as electron donor fresh gas is added through 6.

What is claimed is:

1. A process for the treatment of waste water containing heavy metals, wherein:

(a) the waste water is continuously treated with bacteria which are at least partly immobilised on sand particles in a moving sand bed, to reduce sulphur components and/or metals and to precipitate the metals as water-insoluble metal species, (b) the treated waste water is continuously separated from the sand particles that retain the precipitated metal species, (c) the precipitated metal species are continuously separated from the sand particles using treated waste water, and (d) treated waste water used in step (c) is separated from the precipitated metal species and returned to step (a).

2. A process according to claim 1, in which the heavy metals are present in the waste water at levels below 100 ppm.

3. A process according to claim 1, in which the precipitated metal species are separated from the sand particles by gravitation.

4. A process according to claim 1, in which metals are biologically reduced to a valence state in which they form insoluble salts such as hydroxides, oxides, carbonates or phosphates or to a zero valence state in which they form water-insoluble metals, and said insoluble metal salts or metals are precipitated and then separated.

5. A process according to claim 4, in which said metals comprise selenium, tellurium, uranium, vanadium, chromium, manganese or mixtures thereof.

6. A process according to claim 4, in which said biological reduction is performed using bacteria of the genera Geobacter, Pseudomonas, Shewanella, Desulfovibrio, Desulfobacterium, Desulfomicrobium, Desulforomonas and/or Alteromonas.

7. A process according to claim 1, in which the waste water contains sulphur components and said sulphur components are biologically reduced to sulphide, which forms insoluble metal sulphides, optionally after reduction of the metals, and said insoluble metal sulphides are precipitated and then separated.

8. A process according to claim 7, in which said sulphur components are added to the waste water and comprise elemental sulphur.

9. A process according to claim 7, in which said sulphur components are present in the waste water and comprise sulphate.

10. A process according to claim 7, in which said metals comprise Ag, Tl, In, Cu, Zn, Cd, Ni, Fe, Pb, Sn, Hg, Co, Mn, As, Sb, Bi, Cr, Mo and/or Ti.

11. A process according to claim 7, in which said biological reduction is performed using bacteria of the genera Desulfovibrio, Desulfotomaculum, Desulfomonas, Thermodesulfobacterium, Desulfobulbus, Desulfobacter, Desulfococcus, Desulfonema, Desulfosarcina, Desulfobacterium and/or Desuforomas.

* * * * *